United States Patent [19]

Maddock

[11] 4,064,774
[45] Dec. 27, 1977

[54] WORK HANDLING APPARATUS FOR CENTER DRIVE LATHE

[75] Inventor: William Harvard Maddock, Weston, Canada

[73] Assignee: Standard Modern Tool Company Limited, Toronto, Canada

[21] Appl. No.: 748,548

[22] Filed: Dec. 8, 1976

[51] Int. Cl.² .............................................. B23B 15/00
[52] U.S. Cl. ......................................... 82/45; 82/2.5; 82/8
[58] Field of Search .......................... 82/45, 2.5, 2.7, 8; 29/36

[56] References Cited

U.S. PATENT DOCUMENTS

| | | | |
|---|---|---|---|
| 668,718 | 2/1901 | Sellers et al. | 82/8 |
| 1,338,742 | 5/1920 | Lofton | 29/36 |
| 3,266,349 | 8/1966 | Lane | 82/40 R |
| 3,400,618 | 9/1968 | Steinmetz | 82/2.5 |

*Primary Examiner*—Leonidas Vlachos
*Attorney, Agent, or Firm*—Ridout & Maybee

[57] ABSTRACT

In a work handling apparatus for a center drive lathe having a center chuck and right hand and left hand turrets, the workpiece is accurately located with respect to the chuck, prior to machining, by means of a locating jig mounted on one of the turrets. The workpiece is carried between spring-biassed centers carried by the turrets, and is pushed axially against the weaker spring-bias of one of the centers until it abuts the locating jig, whereupon the chuck clamps the workpiece.

6 Claims, 3 Drawing Figures

WORK HANDLING APPARATUS FOR CENTER DRIVE LATHE

BACKGROUND OF THE INVENTION

This invention relates to work handling apparatus for a center drive lathe of the type having a center chuck for holding a workpiece so that its two ends can be machined at the same time. The lathe may have right hand and left hand turrets which can be positioned longitudinally and transversely with respect to the work axis, each turret providing a plurality of tool carrying faces. The invention relates more particularly to means for accurately locating the workpiece with respect to the chuck, usually centrally but not necessarily so, so that the ends to be machined are correctly presented when a predetermined cycle of machining operations has to be followed. The invention is especially applicable to work handling apparatus for numerically controlled machine tools, wherein the workpiece is placed in the chuck and removed therefrom by a robot, the turrets and the chuck being operated under numerical control in accordance with a given program; however, the invention is not restricted to this application.

SUMMARY OF THE INVENTION

An improved work handling apparatus according to the present invention is characterized by the provision of first and second work supporting centers mounted respectively on the right hand and left hand turrets, each work supporting center having a tapered nose and a body portion extending therefrom, at least one face of each turret providing mounting means engaging the body portion of the respective work supporting center for locating the work supporting center coaxially with the chuck in the operative position of said one face, the centers being spring-biassed axially inwardly towards the chuck, the bias on the second work supporting center being less than the bias on the first, and a work locating jig mounted on the left hand turret, the work locating jig providing an abutment shoulder which is adapted to engage one end of a workpiece carried between the centers for locating the workpiece axially with respect to the chuck. It is understood, of course, that the term "right hand" and "left hand" are used in an arbitrary sense; there is no reason why the locating jig should not alternatively be mounted on the right hand turret.

BRIEF DESCRIPTION OF THE DRAWINGS

One embodiment of the invention, as applied to a work handling apparatus for a numerically controlled center drive lathe, will now be described, by way of example, with reference to the accompanying drawings. In the drawings.

DESCRIPTION OF THE PREFERRED EMBODIMENT

Figure 1:
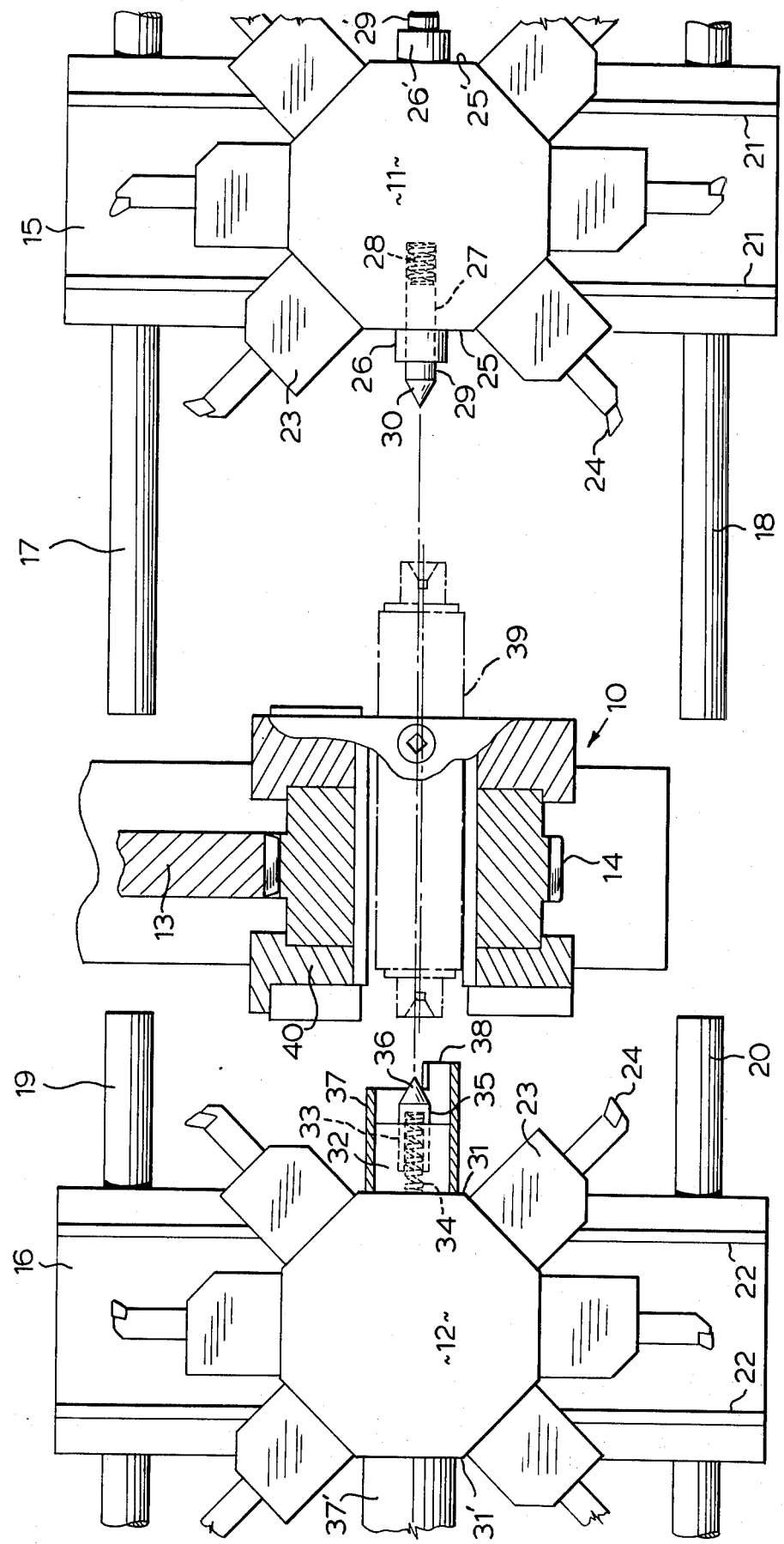
FIG. 1 is a plan view, partly in section, of the work handling apparatus, the workpiece having been placed initially in the chuck.

The lathe illustrated in the drawings has a center chuck 10, which defines a horizontal work axis O, a right hand turret 11, and a left hand turret 12. The lathe itself is of conventional construction and is not illustrated in detail, only the components which are necessary for a proper understanding of the disposition and functioning of the work handling apparatus being shown. The chuck 10 is rotatably driven about its axis by a motor (not shown) through a gear train, the output gear 13 of which is shown meshing with the chuck drive pinion 14. The chuck has radially movable jaws 40, which are moved radially between clamping and open positions. Each of the turrets 11, 12 has eight turret faces which, upon indexing of the turret, are brought sequentially to an operative position.

The turrets 11 and 12 are mounted on respective slides 15, 16 which in turn are guided by guide members 17, 18, 19, 20 for reciprocatory longitudinal movement parallel to the axis, conventional means being provided for moving the slides inwardly and outwardly in the longitudinal direction. These slides provide transverse guide tracks 21, 22 which engage the turrets 11, 12 and constrain the turrets for transverse movement along predetermined paths. Conventional means (not shown) are provided for moving the turrets transversely along the predetermined paths in either direction.

Each turret has two diametrically opposite faces provided with mounting means for work supporting centers, as hereinafter described, the other six faces having carrier attachments 23 for cutting tools 24.

In the case of the turret 11 the two diametrically opposite faces are referenced 25 and 25', the face 25 being shown in the operative position. This face 25 is provided with a cylindrical mounting member 26 which provides a cylindrical socket 27, a compression spring 28 being located at the end of the socket. A work supporting center 29 having a cylindrical body portion and a tapered nose 30 is located by the socket so as to extend axially from the turret face 25 when the latter is in the operative position. The compression spring 28 is a relatively strong spring which engages one end of the center 29 so as to bias the latter axially inwardly towards the chuck 10. The opposite face 25' of the turret also provides identical mounting means 26' for an identical working supporting center 29.

Figure 2:
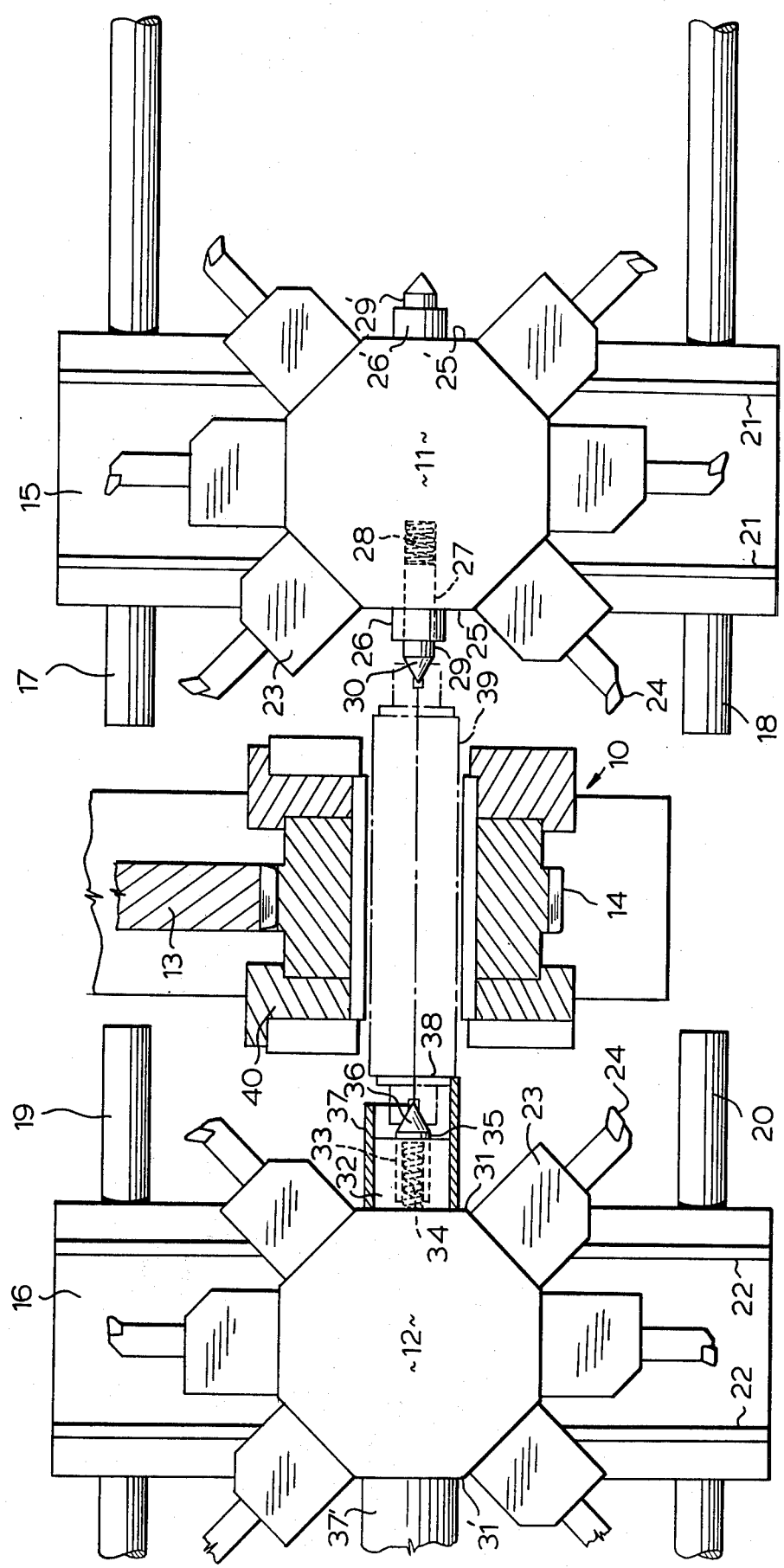
FIG. 2 is a similar view of the apparatus with the workpiece having been located centrally in the chuck.

In the case of the turret 12 the two corresponding opposite faces are referenced 31 and 31' in the drawings, the face 31 being shown in the operative position. This face 31 is provided with a mounting member also in the form of a cylindrical boss 32 which provides a cylindrical socket 33 extending inwardly from the face of the boss, a compression spring 34 being located at the inner end of the socket and bearing against the end of a work supporting center 35 to bias the latter axially towards the chuck 10. It is important that the spring 34 should be weaker than the spring 28, for the reason that will subsequently become apparent. The center 35 has a cylindrical body portion and a tapered work-engaging nose 36. As in the case of the first work supporting center 29, the center 35 is located by the socket so as to extend axially from the face 31 when the latter is indexed to the operative position. However, the left hand turret 12 differs from the right hand turret 11 in that it carries a cylindrical tubular work locating jig 37 mounted over the cylindrical mounting boss 32 so as to extend from the turret face 31 coaxially with the center 35. The jig 37 is cut away at its end to provide an abutment shoulder 38 which is engageable with the end of the workpiece 39 as shown in FIG. 2.

The opposite turret face 31' is similarly furnished, part of the work locating jig being shown at 37'.

The manner in which the work handling apparatus is used in one cycle of a repetitive machining operation will now be described.

Initially, the chuck jaws 40 are open, the previously machined workpiece having been removed from the chuck. The new workpiece to be machined is inserted into the chuck, as by a robot for example, so as to occupy the position indicated at 39 in FIG. 1. At this time the machine slides 15, 16 are positioned along the guides 17, 18, 19, 20 so that the left hand turret is positioned as shown in FIG. 1, the right hand turret 11 being moved clear so as to provide space for loading the workpiece into the chuck. After the workpiece has been loaded and the robot has been retracted clear of the lathe the "cycle start" for the numerical control of the machine is automatically operated.

The right hand turret 11 is moved axially inwardly towards the chuck, the tapered nose 30 of the work supporting center 29 engaging the end of the workpiece 39. As the movement continues, the workpiece is pushed towards the left and its other end engages the work supporting center 35. The movement continues, since the bias of the spring 28 overcomes the opposing bias of the spring 34, until the end of the workpiece engages the abutment shoulder 38 of the jig 37 as shown in FIG. 2. At this position the workpiece 39 is accurately centered or otherwise accurately located along the axis O at a position determined by the machine program. When the workpiece is in position, the auto-chuck wrenches clamp the workpiece in the chuck. The machine slides 15 and 16 are thereupon moved outwardly away from the positions shown and all the required maching operations are performed. When the machining has been completed, the workpiece is unclamped by the auto-chuck wrenches.

Figure 3:
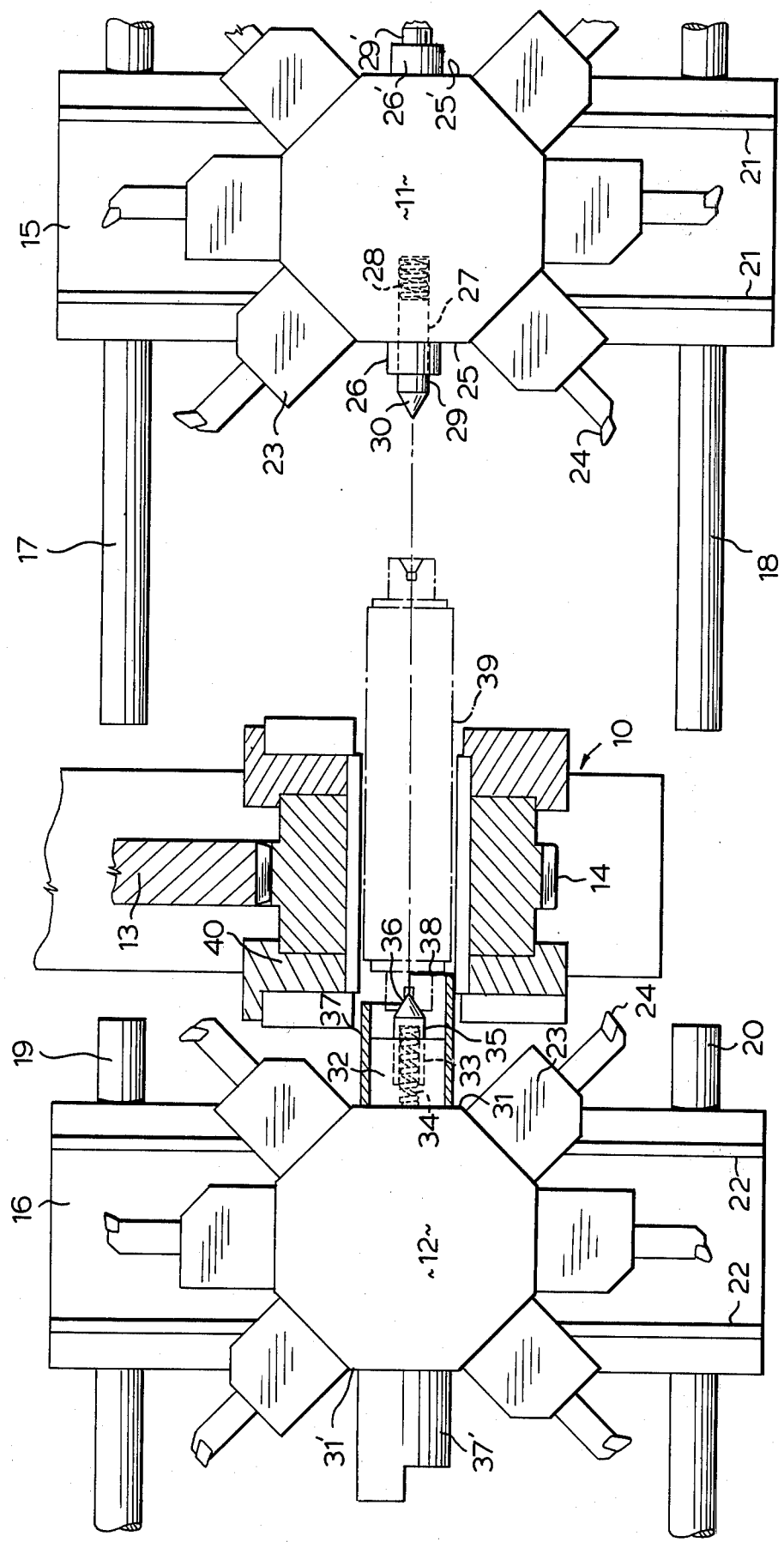
FIG. 3 is a similar view showing a step in the removal of the workpiece from the chuck.

To remove the workpiece, the right hand slide 15 is moved to a clear position, and simultaneously the left hand slide 16 moves axially inwardly, the work supporting center 35 engaging the end of the workpiece as shown in FIG. 3 and ejecting it to a position at which it can be handled by the robot. After ejecting the workpiece, the left hand slide returns to the position shown in FIG. 1, where it is correctly positioned to locate the next workpiece. After the robot has removed the workpiece from the chuck it loads the next workpiece to be machined, and when it has again moved clear of the machine the next "cycle start" operation is initiated automatically.

It will be appreciated that the lathe may alternatively be loaded and unloaded manually by an operator, who would initiate each new cycle by manually actuating a "cycle start" switch after each unloading and reloading operation. Alternatively, instead of a center chuck of the type shown, a collet chuck or equivalent work holding device may be provided for holding the workpiece.

In cases where the workpiece is of raw barstock or tubular, it must be centered by other means than the work supporting centers described above. For such cases, the work supporting centers are replaced by pushers which engage the ends of the workpiece without centering, the centering being effected by the chuck. The pushers are supported by the turrets and one pusher is spring biassed in the same way as the right hand center described above, the other pusher being fixed in relation to the turret on which it is mounted and serving as a work locating jig in the same way as the jig 37.

What I claim as my invention is:

1. In a work handling apparatus for a center drive lathe having a center chuck defining a horizontal work axis, and a right hand and a left hand turret, said turrets being reciprocable longitudinally and transversely with respect to said axis, each turret providing a plurality of turret faces and being indexed to move said turret faces sequentially to an operative position, the improvement comprising:

first and second work supporting centers mounted respectively on said right hand and left hand turrets, each work supporting center having a tapered nose and an elongated body portion extending therefrom, at least one face of each turret providing mounting means engaging the body portion of the respective work supporting center for locating the work supporting center coaxially with the chuck in the operative position of said one face, said mounting means including, respectively, first and second spring biasing means engaging said first and second work supporting centers for biasing said centers axially inwardly towards the chuck, the second spring biasing means being weaker than the first spring biasing means, and a work locating jig mounted on said left hand turret and extending axially from said one face thereof when said one face is in the operative position, the jig providing an abutment shoulder engageable with a workpiece carried between said centers for locating the workpiece axially with respect to the chuck.

2. The improvement claimed in claim 1, wherein the work locating jig is a tubular cylindrical jig mounted on said one face of the left hand turret coaxially with the second work supporting center.

3. The improvement claimed in claim 1, wherein each turret includes a cylindrical socket on said one face defining said mounting means, the body portion of the respective work supporting center being located in the socket, said spring biasing means comprising first and second compression springs located in the sockets and bearing against the ends of said body portions.

4. The improvement claimed in claim 1, wherein each turret has an even number of turret faces, two diametrically opposite faces of each turret providing mounting means for two work supporting centers, the other faces being tool carrying faces.

5. The improvement claimed in claim 1, wherein said turrets are mounted respectively on right hand and left hand slides which are guided for reciprocatory longitudinal movement with respect to said axis, each slide providing transverse guide means engaging the respective turret for guiding the turret along a predeterminded transverse path.

6. In a work handling apparatus for a center drive lathe having a center chuck defining a horizontal work axis, and a right hand and a left hand turret, said turrets being reciprocable longitudinally and transversely with respect to said axis, each turret providing a plurality of turret faces and being indexed to move said turret faces sequentially to an operative position, the improvement comprising:

first and second work supporting members mounted respectively on said right hand and left hand turrets, each work supporting member being adapted to engage a respective end of a workpiece to be positioned, at least one face of each turret providing mounting means engaging the respective work supporting member for locating the work supporting member coaxially with the chuck in the operative position of said one face, the first work supporting member being spring biassed axially inwardly towards the chuck, and the second work supporting member constituting a work locating jig mounted on said left hand turret and extending axially from said one face thereof when said one face is in the operative position, the jig being engageable with the workpiece carried between said work supporting members for locating the workpiece axially with respct to the chuck.

* * * * *